(12) United States Patent
Jang

(10) Patent No.: US 10,107,294 B2
(45) Date of Patent: Oct. 23, 2018

(54) CORELESS DONUT-TYPE MOTOR FAN FOR VENTILATION AND COOLING

(71) Applicant: Suk Ho Jang, Gwangmyeong-si (KR)

(72) Inventor: Suk Ho Jang, Gwangmyeong-si (KR)

( * ) Notice: Subject to any disclaimer, the term of this patent is extended or adjusted under 35 U.S.C. 154(b) by 196 days.

(21) Appl. No.: 15/321,599

(22) PCT Filed: May 14, 2015

(86) PCT No.: PCT/KR2015/004825
§ 371 (c)(1),
(2) Date: Dec. 22, 2016

(87) PCT Pub. No.: WO2015/199332
PCT Pub. Date: Dec. 30, 2015

(65) Prior Publication Data
US 2017/0159663 A1  Jun. 8, 2017

(30) Foreign Application Priority Data

Jun. 25, 2014 (KR) .................. 10-2014-0077824

(51) Int. Cl.
*F04D 25/08* (2006.01)
*F04D 25/06* (2006.01)
(Continued)

(52) U.S. Cl.
CPC ........... *F04D 25/08* (2013.01); *F04D 19/002* (2013.01); *F04D 25/0606* (2013.01);
(Continued)

(58) Field of Classification Search
CPC ........ F04D 25/06; F04D 25/08; F04D 25/066; F04D 25/0606; F04D 25/166; F04D 29/38; F04D 29/526; F04D 29/326; F04D 29/325; F04D 29/542; F04D 29/522; F04D 19/002; F04D 3/005; F04D 19/007; F04D 13/12; F04D 25/026; F04D 25/068; F04D 29/34; F04D 29/663; F04D 29/584; F04D 29/263; F04D 25/0613; F04D 25/062;
(Continued)

(56) References Cited

U.S. PATENT DOCUMENTS

2016/0010653 A1* 1/2016 Lin .................. F04D 17/16
415/170.1

FOREIGN PATENT DOCUMENTS

JP   2009-100543 A   5/2009
JP   2013-189934 A   9/2013
(Continued)

*Primary Examiner* — Alexander Comley
*Assistant Examiner* — Christopher Brunjes
(74) *Attorney, Agent, or Firm* — Novick, Kim & Lee, PLLC; Jae Youn Kim

(57) ABSTRACT

The present invention relates to a coreless donut-type fan, and more particularly, to a coreless donut-type motor fan for ventilation and cooling, in which a rotating force is generated by wings themselves, without a separate rotational power such as a motor provided in a central portion thereof, and a through hole is formed in the central portion thereof to prevent a "wind barrier" phenomenon during rotation at a high speed, thereby maintaining smooth air flow, minimizing power consumption, in particular, preventing rotational noise due to induction of smooth rotation, and improving rotational efficiency.

2 Claims, 8 Drawing Sheets

(51) Int. Cl.
  *F04D 29/32* (2006.01)
  *F04D 29/52* (2006.01)
  *F04D 19/00* (2006.01)
  *H02K 16/02* (2006.01)
  *H02K 7/14* (2006.01)

(52) U.S. Cl.
  CPC ......... *F04D 25/066* (2013.01); *F04D 29/325* (2013.01); *F04D 29/326* (2013.01); *F04D 29/522* (2013.01); *F04D 29/526* (2013.01); *H02K 7/14* (2013.01); *H02K 16/02* (2013.01); *F05D 2240/61* (2013.01); *F05D 2250/75* (2013.01)

(58) Field of Classification Search
  CPC .. F04D 25/064; F04D 25/0653; F04D 29/181; F04D 29/186; F04D 29/20; F04D 29/329; F05D 2250/75; F05D 2240/61; H02K 7/14; H02K 16/02; F01P 5/02; F01P 1/06; F01P 2005/025
  USPC .................................. 416/124, 126; 415/60
  See application file for complete search history.

(56) References Cited

FOREIGN PATENT DOCUMENTS

| | | | |
|---|---|---|---|
| JP | 2013189934 A | * | 9/2013 |
| KR | 20-2000-0016656 U | | 9/2000 |
| KR | 10-0956358 B1 | | 5/2010 |
| KR | 10-1259719 B1 | | 4/2013 |

* cited by examiner

CORELESS DONUT-TYPE MOTOR FAN FOR VENTILATION AND COOLING

TECHNICAL FIELD

The present invention relates to a coreless donut-type fan, and more particularly, to a coreless donut-type motor fan for ventilation and cooling that prevents a "wind barrier" phenomenon in which wind resistance is applied to wings and a motor during the wind passing therethrough at a high speed, thereby allowing air to smoothly flow while ensuring high-speed rotation, preventing rotational noise occurring during rotation, and improving rotational efficiency.

BACKGROUND ART

Generally, a fan is installed in a home, a factory, or the like, and is used for discharging hazy air inside of the room to provide ventilation. The fan may be classified into a ventilation fan and a cooling fan for preventing heating an engine of an automobile or a driving part of a computer.

Meanwhile, the above-described conventional ventilation fan obtains a rotational power by a motor provided in a central portion thereof as a ventilation fan disclosed in Korean Utility Model Registration Application No. 20-1999-0001707 and a cooling fan disclosed in Korean Patent Registration No. 10-0956358. A motor shaft of the fan has wings formed in a radial shape, such that when the motor is driven, air is sucked and discharged through the rotation of the wings to perform ventilation and cooling.

However, the conventional fan as described above should have a structure in which the wings rotate by receiving the rotational power of the motor located in the central portion thereof. Therefore, when the wings rotate at a high speed, a "wind barrier" phenomenon in which wind resistance is applied to wings and the motor occurs, and smooth flow of the air is obstructed. Thereby, a significant amount of power is consumed to forcibly drive the wings. In particular, there are problems that a considerable level of noise is generated due to the forcibly driving, and a rotational efficiency is considerably reduced.

PRIOR ART DOCUMENT

Patent Document (Patent Document 1) Korean Utility Model Registration Application No. 20-1999-0001707.
(Patent Document 2) Korean Patent Registration No. 10-0956358.

DISCLOSURE

Technical Problem

In consideration of the above-mentioned circumstances, it is an object of the present invention to provide a coreless donut-type motor fan for ventilation and cooling, in which a rotating force is generated by wings themselves, without a separate rotational power such as a motor provided in a central portion thereof, and a through hole is formed in the central portion thereof to prevent a "wind barrier" phenomenon during rotation at a high speed, thereby maintaining smooth air flow, minimizing power consumption, in particular, preventing rotational noise due to induction of smooth rotation, and improving rotational efficiency.

Technical Solution

In order to achieve the above-described object, according to an aspect of the present invention, there is provided a coreless donut-type motor fan for ventilation and cooling, including: a fixed body including a frame body and a tubular coil plate, wherein the frame body includes a shaft tube having a through hole formed in a central portion thereof, and an outer tube which is spaced apart from the shaft tube and has a vertical portion connected to the shaft tube by a plurality of supports and a horizontal portion extending from the vertical portion orthogonal thereto, and the tubular coil plate extends from the vertical portion at a position spaced apart inward from the horizontal portion, and includes a plurality of coils radially formed on inner and outer sides thereof; and a rotating body including a rotary tube rotatably mounted on an outer circumference of the shaft tube through a bearing, a plurality of guide wings whose one ends are fixed on an outer circumference of the rotary tube and radially extend therefrom, and a tubular magnet plate having a first magnet plate and a second magnet plate which are connected to the guide wings at the other ends of the guide wings and form a "U"-shaped coil plate housing groove therebetween in which the coil plate is housed, and magnet bodies respectively formed on facing surfaces of the first magnet plate and the second magnet plate.

Advantageous Effects

According to the coreless donut-type motor fan for ventilation and cooling of the present invention, a through hole is formed in the central portion thereof without a separate motor mounted therein, and the wings themselves can be rotated by a repulsive force and an attractive force alternately applied thereto. Therefore, an air stream may smoothly flow while a whirlwind is formed through the through hole formed in the central portion thereof to completely prevent the wind barrier, and indoor air may be smoothly sucked and discharged even when rotating at a high speed. Thereby, it is possible to minimize power consumption for providing the rotational power, and rotate the wings without a separate coupling means such as a shaft to completely shield the noise occurring during rotation, as well as significantly improve the rotational efficiency.

DESCRIPTION OF SYMBOLS

Figure 1:
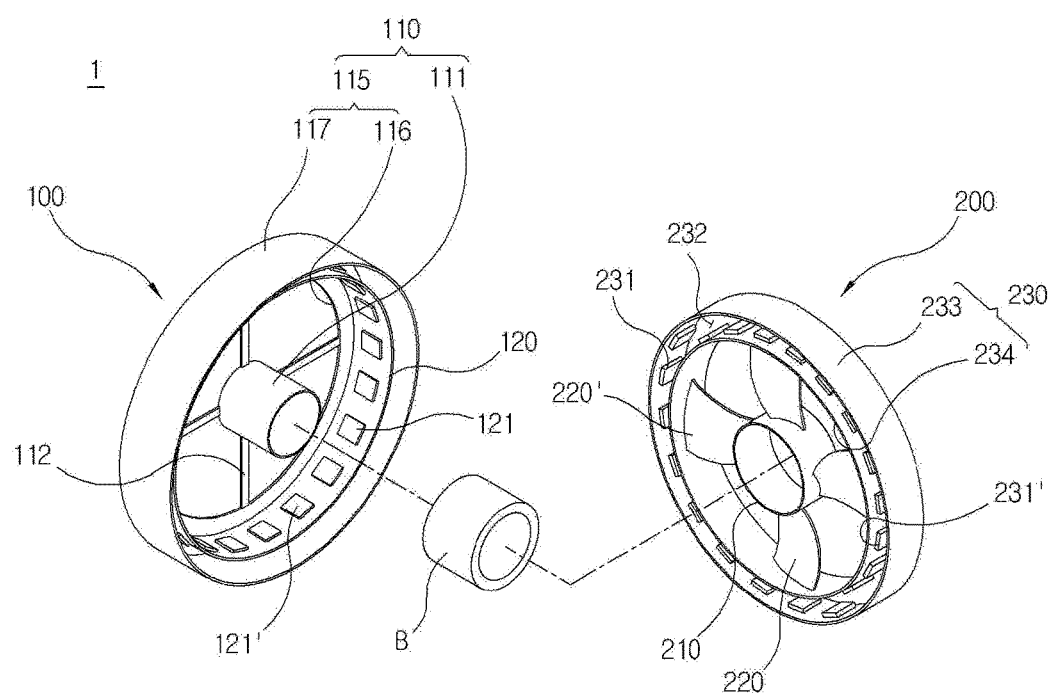
FIG. 1 is an exploded perspective view illustrating a coreless donut-type motor fan for ventilation and cooling according to an embodiment of the present invention.

100: fixed body,
110: frame body
111: shaft tube,
112: support
115: outer tube,
116: vertical portion
117: horizontal portion,
120: coil plate
121, 121': coil
200: rotating body,
210: rotating tube
220, 220': guide wing,
221: extension vane
230: magnet plate
231, 231': magnet body,
232: coil plate housing groove
233: first magnet plate,
234: second magnet plate

BEST MODE

Terms or words used in the specification and claims should not be construed as limited to a conventional or lexical meaning, and should be understood as appropriate notions by the inventor based on that he/she is able to define terms to describe his/her invention in the best way to be seen by others.

Therefore, embodiments described in the specification and configurations illustrated in the drawings are the most preferred embodiment of the present invention and not exhaustive, and it will be understood that various modifications and equivalents may be made to take the place of the embodiments at the application point of the present invention Hereinafter, preferred embodiments of the present invention will be described in detail with reference to the accompanying drawings.

Figure 2:
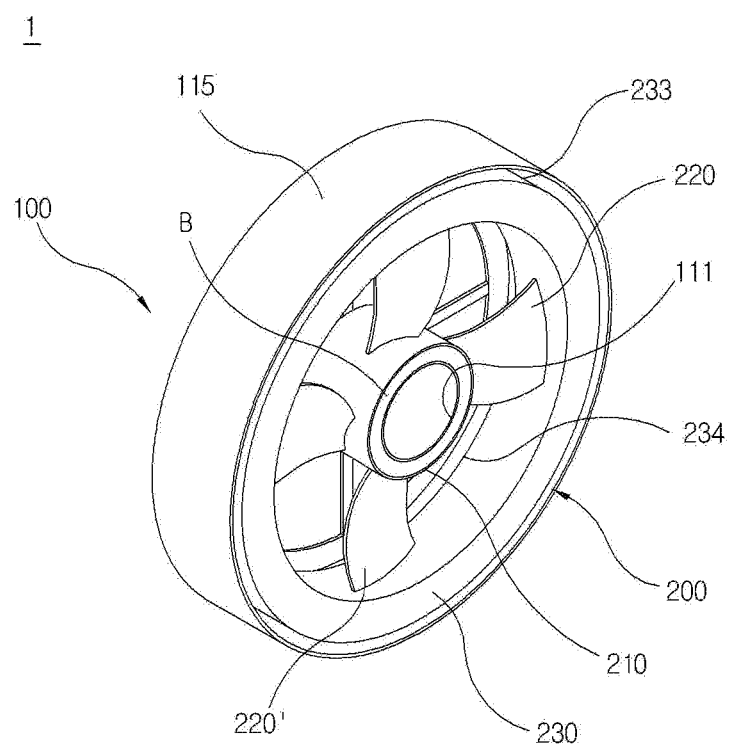
FIG. 2 is an assembled perspective view illustrating the coreless donut-type motor fan for ventilation and cooling according to the embodiment of the present invention.
Figure 3:
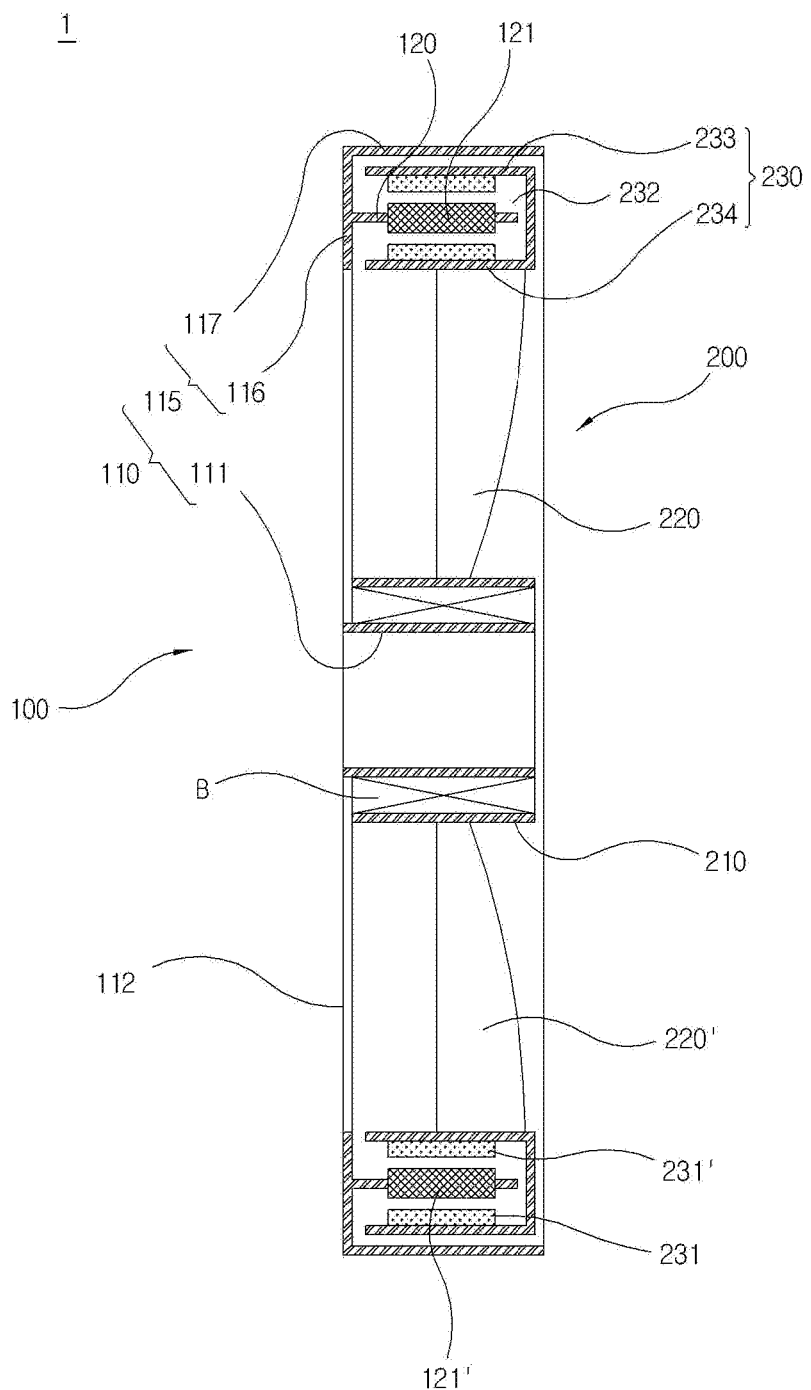
FIG. 3 is a longitudinal sectional view illustrating the coreless donut-type motor fan for ventilation and cooling according to the embodiment of the present invention.
Figure 4:
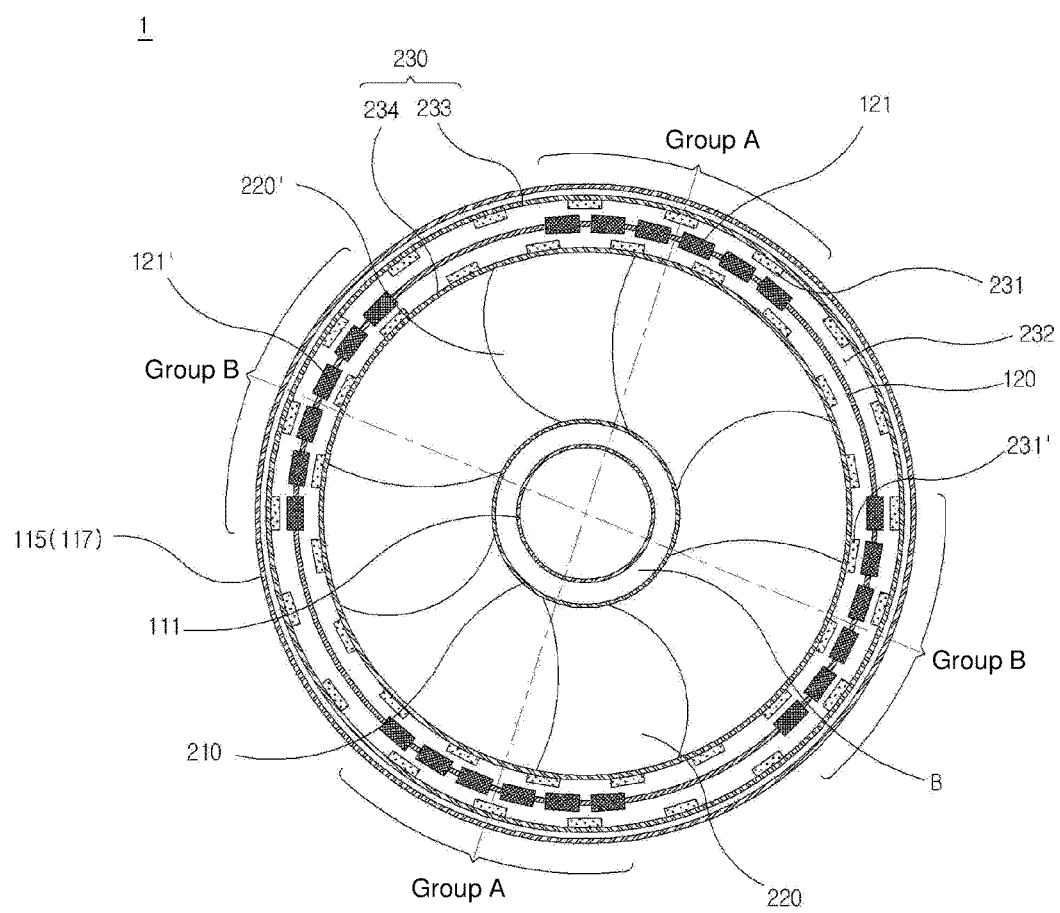
FIG. 4 is a cross-sectional view illustrating the coreless donut-type motor fan for ventilation and cooling according to the embodiment of the present invention.

FIG. 1 is an exploded perspective view illustrating a coreless donut-type motor fan for ventilation and cooling according to an embodiment of the present invention, FIG. 2 is an assembled perspective view illustrating the coreless donut-type motor fan for ventilation and cooling according to the embodiment of the present invention, FIG. 3 is a longitudinal sectional view illustrating the coreless donut-type motor fan for ventilation and cooling according to the embodiment of the present invention, and FIG. 4 is a cross-sectional view illustrating the coreless donut-type motor fan for ventilation and cooling according to the embodiment of the present invention.

As illustrated in FIGS. 1 to 4, a coreless donut-type motor fan 1 for ventilation and cooling according to an embodiment of the present invention includes a fixed body 100 and a rotating body 200.

Herein, the fixed body 100 includes a frame body 110 and a coil plate 120.

In this case, the frame body 110 has a tubular shaft tube 111 having a through hole formed in a central portion thereof.

A tubular outer tube 115 having a diameter larger than that of the shaft tube 111 and spaced apart therefrom is provided at an outside of the shaft tube 111. The shaft tube 111 and the outer tube 115 are connected with each other by a plurality of supports 112.

At this time, the outer tube 115 has a vertical portion 116 disposed orthogonal to the shaft tube 111, and the vertical tube 116 and an outer circumference of the shaft tube 111 are connected with each other by the supports 112.

In addition, a horizontal portion 117 extends from the outer periphery of the vertical portion 116 orthogonal thereto. At this time, the horizontal portion 117 is formed so as to have the same extension direction as the shaft tube 111.

The coil plate 120 is formed in a tubular shape, and is configured so as to be spaced apart from the horizontal portion 117 at an inside of the horizontal portion 117 of the frame body 110 and extend from the vertical portion 116 orthogonal thereto.

At this time, the coil plate 120 includes a plurality of coils 121 and 121'. In this case, the coils of groups A and groups B disposed radially symmetrically with each other are alternately arranged. The coils 121 and 121' penetrate inner and outer sides of the coil plate 120, and are configured so as to be exposed to inner and outer circumferences.

The rotating body 200 includes a rotary tube 210, guide wings 220 and 220', and a magnet plate 230, and is configured to be rotatable in a forward or a reverse direction.

At this time, the rotary tube 210 serves to couple the rotating body 200 to the frame body 110, and is formed in a tubular shape. In addition, the rotary tube is rotatably coupled to the outer circumference of the shaft tube 111 through a bearing B.

One ends of the plurality of guide wings 220 and 220' are fixed radially to the outer periphery of the rotary tube 210, and are configured to suck and discharge air during rotation.

The magnet plate 230 is formed in a tubular shape, and a plurality of magnet bodies 231 and 231' corresponding to the coils 121 and 121' of the coil plate 120 are radially formed thereon. Therefore, the coreless donut-type motor fan is configured to be able to rotate in the forward or reverse direction depending on the direction of the current applied to the coils 121 and 121'.

At this time, the magnetic plate 230 is connected to the other ends of the respective guide wings 220 and 220'. That is, the other ends of the respectively guide wings 220 and 220' are connected to an inner circumference of the tubular magnet plate 230, and the magnet plate is configured to rotate together with the guide wings 220 and 220'.

The magnet plate 230 includes a first magnet plate 233 and a second magnet plate 234 which surround the coil plate 120 and has a coil plate housing groove 232 in which the coil plate 120 is housed. The coil plate housing groove has a U-shaped cross section formed by these magnet plates, and the magnet bodies 231 and 231' corresponding to the coils 121 and 121' are arranged on the facing surfaces of the first magnet plate 233 and the second magnet plate 234, respectively. Specifically, the other ends of the guide wings 220 and 220' are connected to the inner circumference of the second magnet plate 234.

Figure 5:
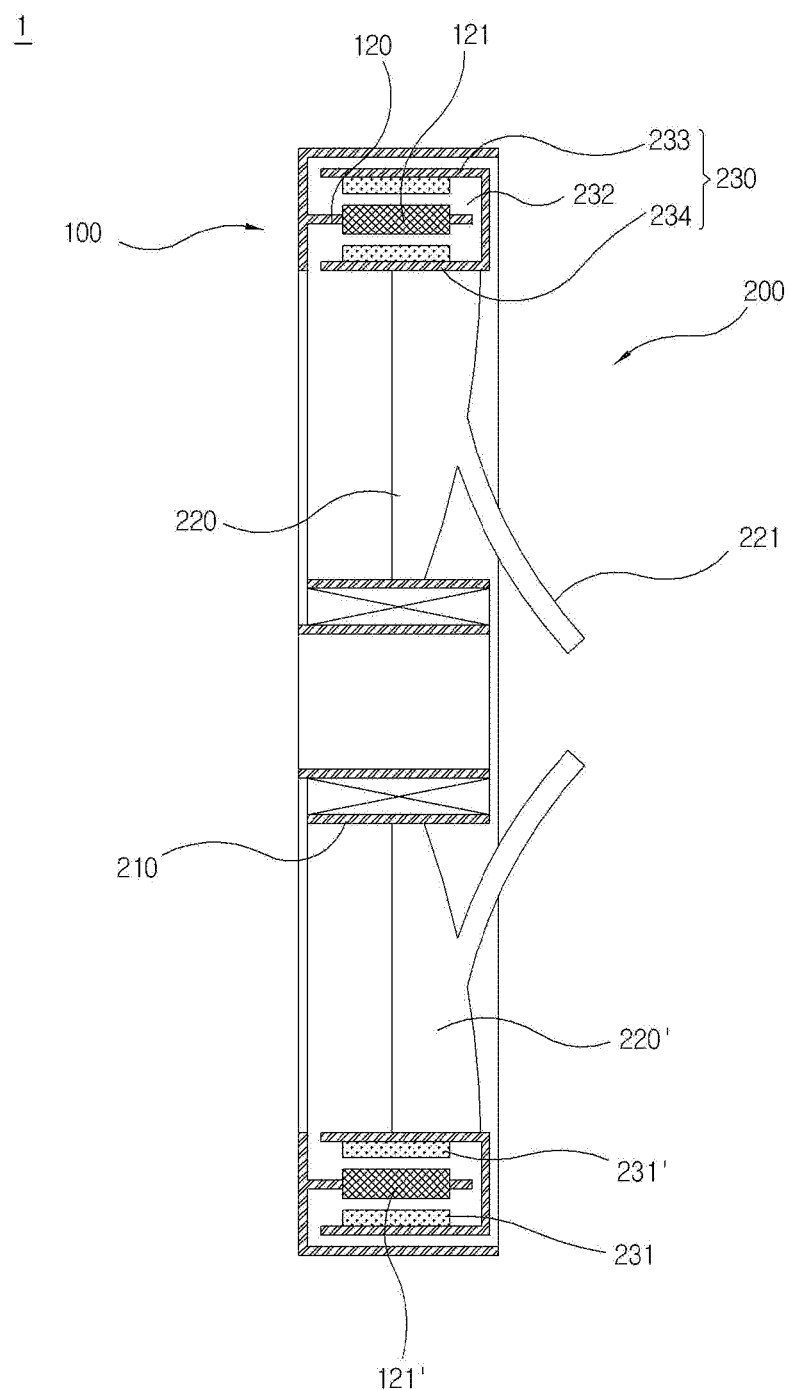
FIG. 5 is a longitudinal sectional view illustrating a coreless donut-type motor fan for ventilation and cooling according to another embodiment of the present invention.

Meanwhile, as illustrated in FIG. 5, the guide wings 220 and 220' connected to the rotary tube 210 further include extension vanes 221 formed to extend toward the center of the shaft tube 111. The extension vanes 221 are preferably spaced apart from the shaft tube 111 so as not to interfere with the shaft tube 111. Therefore, during rotating the rotating body 200, the wind flowing through the shaft tube 111 is quickly sucked by the extension vanes 221 to form a whirlwind, such that it is possible to more quickly and smoothly discharge the air than the fan without the extension vane.

Hereinafter, an operation of the coreless donut-type motor fan for ventilation and cooling of the present invention having the above-described structure will be described in detail with reference to the accompanying drawings.

First, the coreless donut-type motor fan 1 for ventilation and cooling according to the present invention having the above-described configuration is installed in ventilation ports of a home, a factory, or the like, and a place (not illustrated in the drawings) required for ventilation and cooling such as an engine of an automobile, a computer, or the like.

Figure 6:
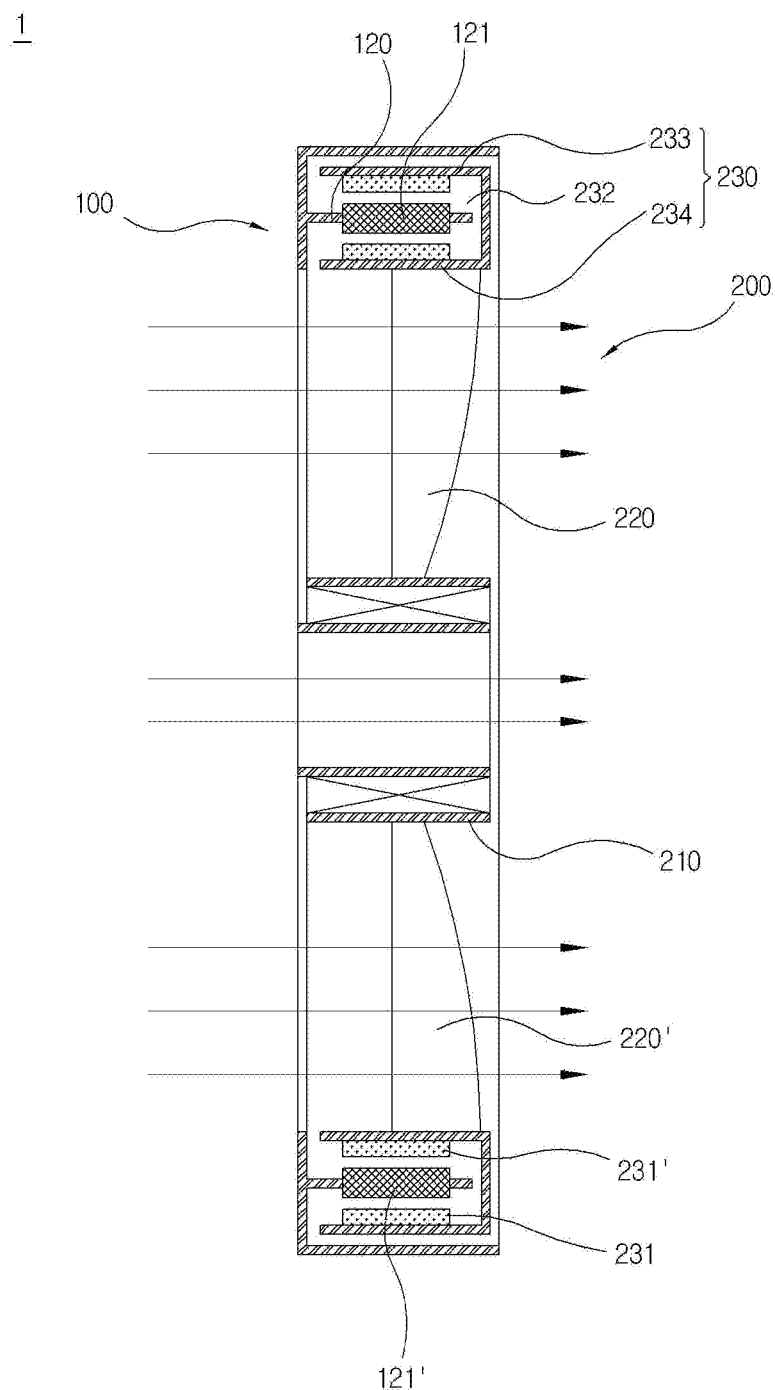
FIG. 6 is a longitudinal sectional view illustrating a ventilation operational state of the coreless donut-type motor fan for ventilation and cooling according to the embodiment of the present invention.

As illustrated in FIG. 6, the motor fan of the present invention may be used as a ventilation fan.

Referring to FIGS. 1 to 5, when power is applied to the coils 121 and 121' formed on the coil plate 120 of the fixed body 100, polarities of the charges generated from the coils 121 and 121' interfere with the polarities of the magnet bodies 231 and 231' of the first and second magnet plates 233 and 234, and thereby an attraction force and a repulsive force are generated therebetween. Due to the alternating action of the attraction force and the repulsive force, the rotating body 200 can rotate by itself.

Accordingly, as described above, the rotating body 200 rotates, and sucks air through the guide wings 220 and 220' and discharges the air to the outside.

Figure 7:
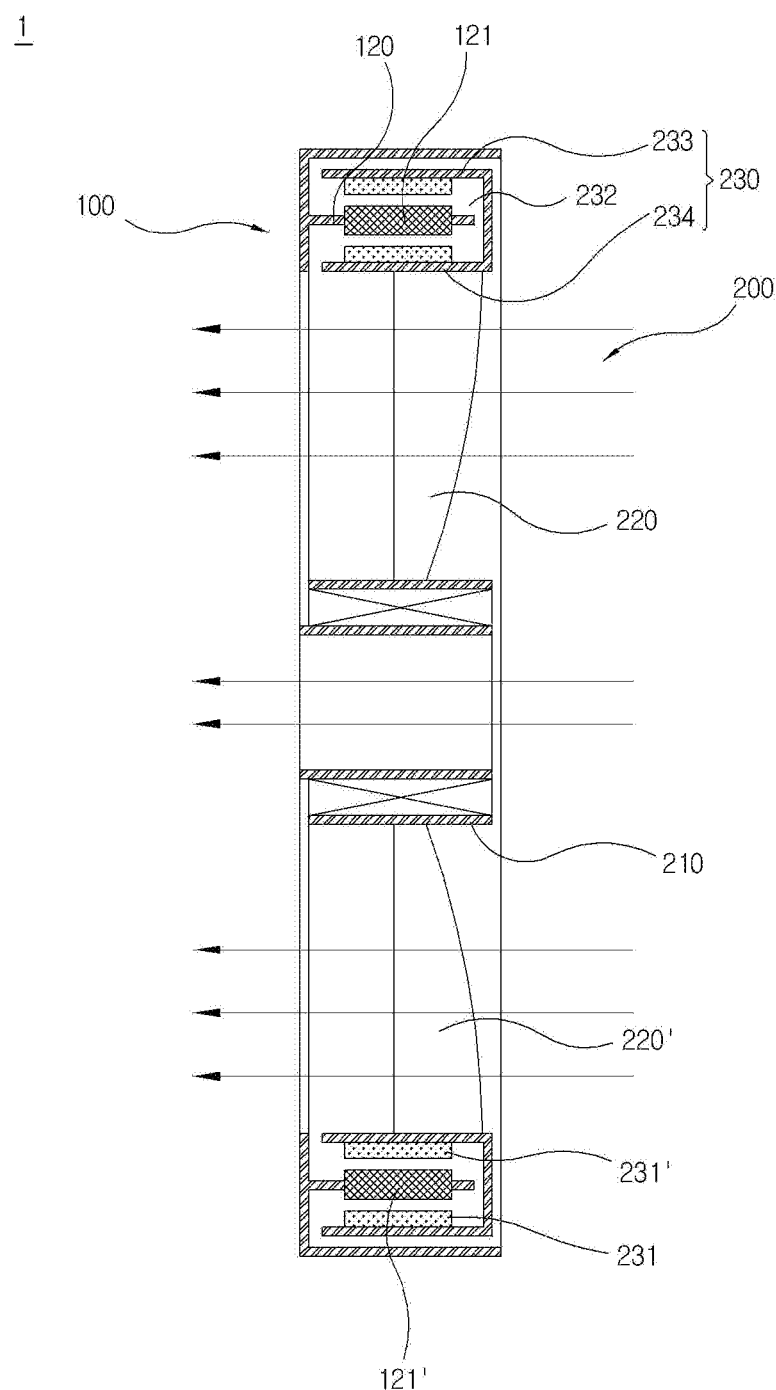
FIG. 7 is a longitudinal sectional view illustrating a cooling operational state of the coreless donut-type motor fan for ventilation and cooling according to the embodiment of the present invention.

Next, as illustrated in FIG. 7, the motor fan of the present invention may be used as a cooling fan.

Similar to the ventilation fan, referring to FIGS. 1 to 5, when the power is applied to the coils 121 and 121' formed on the coil plate 120 of the fixed body 100, the polarities of the charges generated from the coils 121 and 121' interfere with the polarities of the magnet bodies 231 and 231' of the first and second magnet plates 233 and 234, and thereby an attraction force and a repulsive force are generated therebetween. Due to the alternating action of the attraction force and the repulsive force, the rotating body 200 can rotate by itself.

Therefore, as described above, the rotating body 200 rotates, and sucks air through the guide wings 220 and 220' and discharges the air to a place to be cooled.

Further, in the motor fan 1 according to the present invention, a central portion of the rotating body 200 is mounted on the shaft tube 111 of the fixed body 100 through a bearing. As described above, during the wind passing through the guide wings 220 and 220', the "wind barrier" phenomenon in which wind resistance is applied thereto is prevented, and a jet stream is generated through the shaft tube 111 together with the suction and discharge power of the guide wings 220 and 220'. Therefore, the air can be quickly discharged rearward.

Furthermore, as described above, in the process of providing the suction and discharge power, the operation as the ventilation fan and the cooling fan is performed by switching the direction of the current applied to the coils 121 and 121', such that the rotating body 200 can rotate in the forward or reverse direction. This operation may be performed by providing a separate button (not illustrated in the drawings) for switching the direction of the current.

Figure 8:
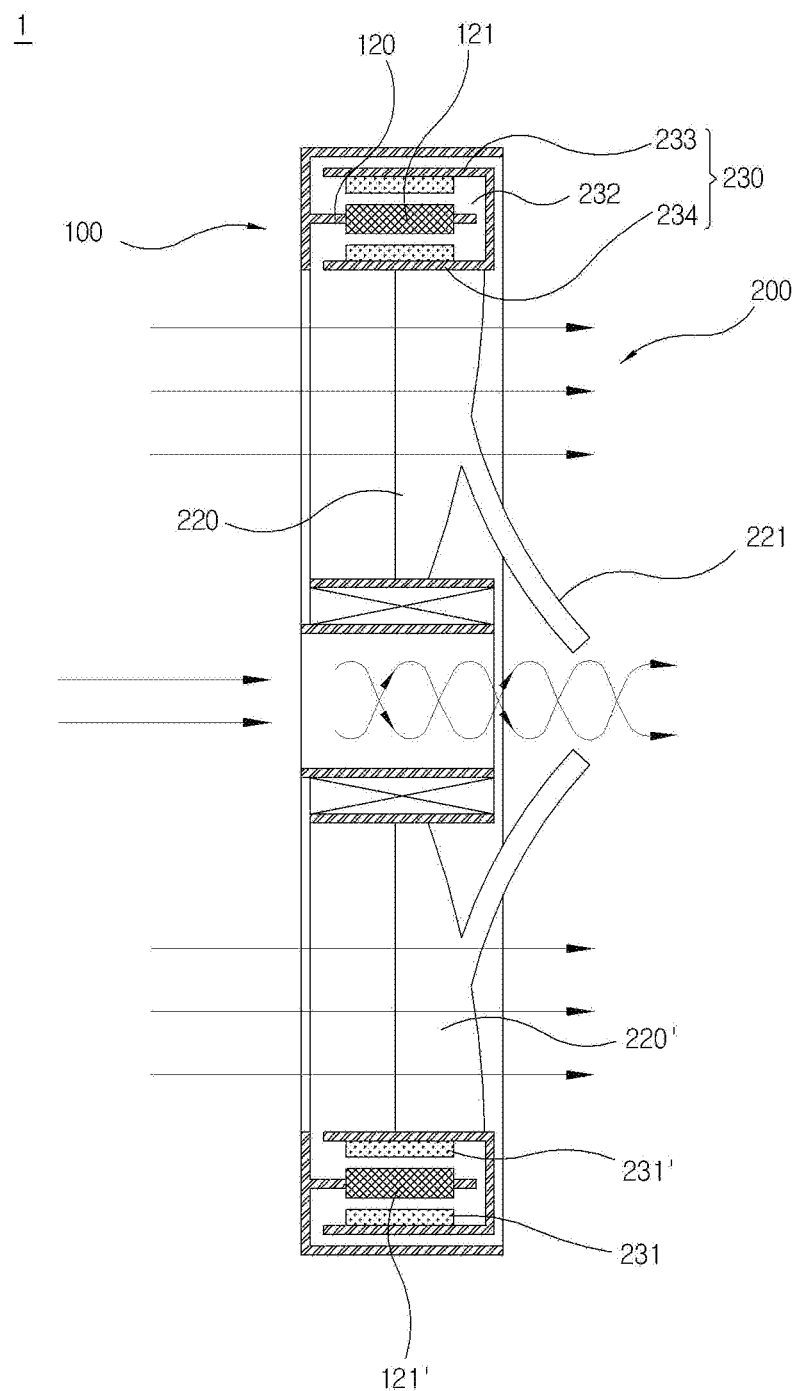
FIG. 8 is a longitudinal sectional view illustrating an operational state of the coreless donut-type motor fan for ventilation and cooling according to another embodiment of the present invention.

Referring to FIG. 5, as illustrated in FIG. 8, the guide wings 220 and 220' have the extension vanes 221 formed to extend toward the center of the shaft tube 111. Therefore, during rotating the rotating body 200, the wind flowing through the shaft tube 111 is rapidly sucked to form a whirlwind, such that it is possible to more quickly and smoothly discharge the air without the wind barrier phenomenon than the fan without the extension vane.

As described above, according to the coreless donut-type motor fan for ventilation and cooling of the present invention, a rotational force is generated by itself without a separate motor, and the suction and discharge power of the wind is considerably improved. In addition, by preventing the "wind barrier phenomenon," it is possible to maintain the smooth flow of air, minimize the power consumption according to a load, prevent noise from being generated at high-speed rotation unlike the conventional motor driving fan, and significantly improve the rotational efficiency.

The invention claimed is:
1. A coreless donut-type motor fan for ventilation and cooling, comprising:
a fixed body including a frame body and a tubular coil plate, wherein the frame body includes a shaft tube having a through hole formed in a central portion thereof, and an outer tube which is spaced apart from the shaft tube and has a vertical portion connected to the shaft tube by a plurality of supports and a horizontal portion extending from the vertical portion orthogonal thereto, and the tubular coil plate extends from the vertical portion at a position spaced apart inward from the horizontal portion, and includes a plurality of coils and radially formed on inner and outer sides thereof; and
a rotating body including a rotary tube rotatably mounted on an outer circumference of the shaft tube through a bearing, a plurality of guide wings whose radially inner ends are fixed on an outer circumference of the rotary tube and radially extend therefrom, and a tubular magnet plate having a first magnet plate and a second magnet plate which are connected to the guide wings at radially outer ends of the guide wings and form a "U"-shaped coil plate housing groove therebetween in which the coil plate is housed, and magnet bodies respectively formed on facing surfaces of the first magnet plate and the second magnet plate.
2. The coreless donut-type motor fan for ventilation and cooling according to claim 1, wherein the guide wings further include extension vanes which extend toward a center of the shaft tube so as to be spaced apart from the shaft tube of the fixed body.

* * * * *